UNITED STATES PATENT OFFICE.

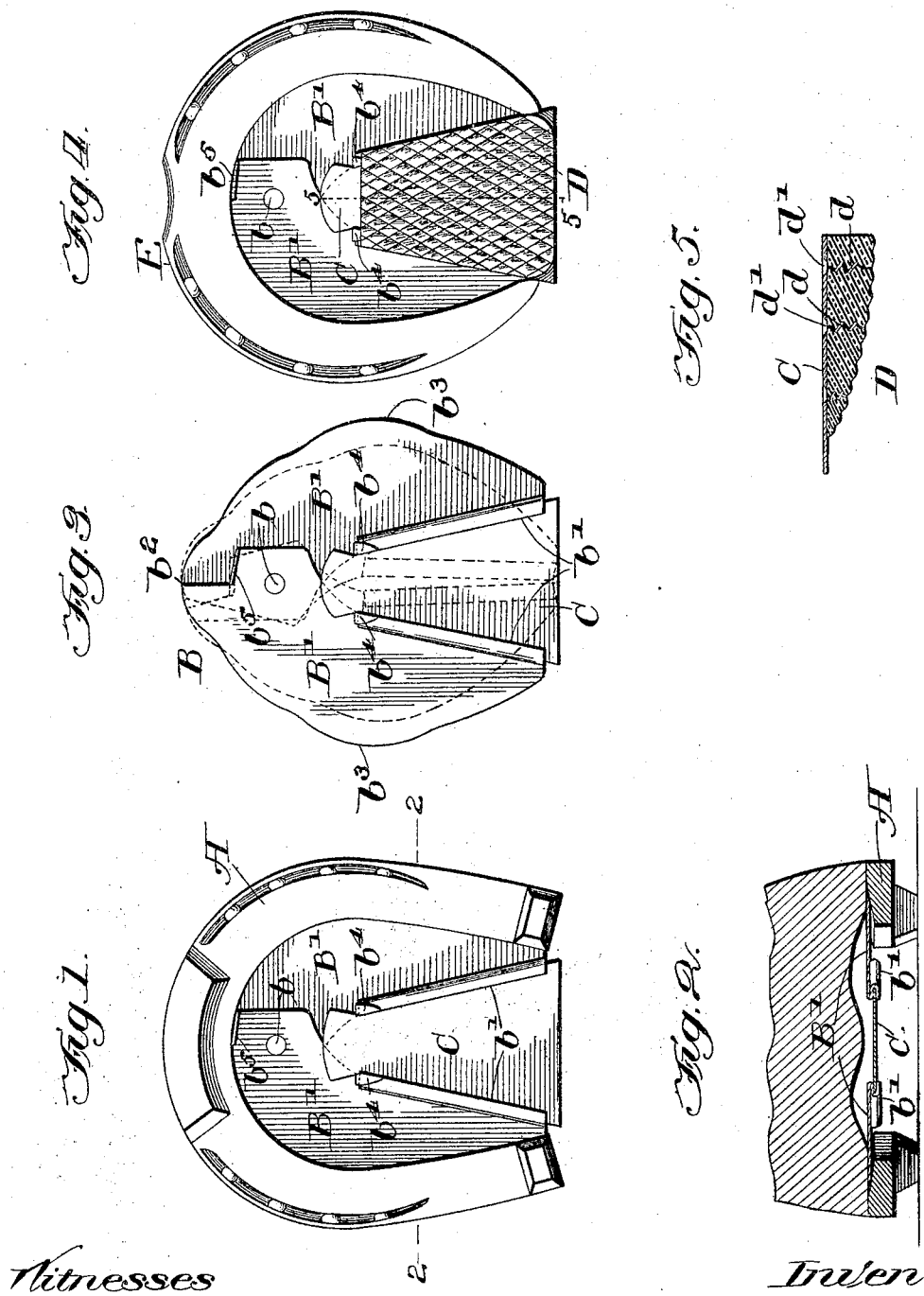

WILLIAM B. FAIRWEATHER AND GEORGE DUFFIELD, OF CHICAGO, ILLINOIS.

HOOF-PAD.

No. 803,219.  Specification of Letters Patent.  Patented Oct. 31, 1905.

Application filed April 15, 1903. Serial No. 152,654.

*To all whom it may concern:*

Be it known that we, WILLIAM B. FAIRWEATHER and GEORGE DUFFIELD, of Chicago, in the county of Cook and State of Illinois, have invented certain new and useful Improvements in Hoof-Pads; and we do hereby declare that the following is a full, clear, and exact description thereof, reference being had to the accompanying drawings, and to the letters of reference marked thereon, which form a part of this specification.

This invention relates to improvements in hoof-pads of that class designed to be interposed between the hoof of the animal and the shoe and constructed to shield the sole of the hoof from penetration by nails and other sharp articles in the roadway.

The invention consists in the matters hereinafter set forth, and more particularly pointed out in the appended claims.

In the drawings, Figure 1 is a bottom plan view of a horseshoe and a hoof-pad, the latter being made in accordance with our invention. Fig. 2 is a transverse section taken on line 2 2 of Fig. 1. Fig. 3 is a plan view of the hoof-pad removed from the shoe, showing by full and dotted lines, respectively, the pad opened and closed. Fig. 4 is a bottom plan view of another form of the pad. Fig. 5 is a transverse section taken on line 5 5 of Fig. 4.

As shown in the drawings, A designates a horseshoe, which may be made of any preferred construction.

B designates our improved pad, which is made of sheet metal, desirably possessing some resiliency, and consists of two lateral members B' B', made of proper shape and dimensions to extend across the sole of the hoof between the bars of the shoe and from front to rear of the shoe. Said lateral members of the pad are preferably hinged together at their front ends by means of a pin or rivet $b$ extending through the overlapping parts of said members, whereby said members may be swung toward and from each other in their planes to increase or diminish the width of the pad as a whole.

The front and side margins of the pad are adapted to be inserted between the hoof and the shoe, the beveled upper faces of the shoe-bars, at the inner margins thereof, providing grooves or spaces, as shown in Fig. 2, to receive said margins of the pad.

The pad when closed, as indicated in dotted line in Fig. 3, is of such width that it may be inserted between the bars of the shoe across the sole of the foot, and said members are thereafter spread or swung laterally away from each other to force the side margins of the pad members into the spaces between the inner margins of the shoe-bars and the hoof. Preferably the expanding or spreading means also serves as a lock to hold the pad members in their expanded position and constitutes a portion of the shielding area of the pad, so that when the pad members are expanded so as to force their side and front members between the shoe and hoof the pad is thereby securely connected with the shoe, so as to require no other fastening means.

The means herein shown for expanding or spreading the pad members outwardly and locking the same in their expanded position consists of a wedge C, preferably made of the same material as the pad members. The pointed end of said wedge extends forwardly and is adapted at its margins for interlocking and guiding connection with the inner margins of the pad members. As herein shown, the inner margins of the pad members are provided on their under surfaces with folds $b'$, which are formed to constitute inwardly-facing guide-grooves, and the tapered or inclined margins of the wedge are provided with plain faces which are adapted to enter said grooves. With this construction when the pad has been inserted into place between the bars of the shoe the tapered or pointed end of the wedge is inserted into said guide-grooves and forced or driven inwardly, thereby forcing the outer margins of the pad members between the hoof and the shoe.

In some instances we may omit the hinged connection between the pad members, it being obvious that when said pad members are inserted into the space between the shoe-bars and the wedge driven between the same said members will be spread outwardly into their proper positions regardless of their hinged connection. The hinged construction is preferable, however, as it affords a ready means of handling the pad and facilitates its application to the hoof.

It is obvious that the provision of guide-grooves on the tapered side margins of the wedge engaged by the plane inner margins of the pad members will produce substantially the same guiding and interlocking connection between the wedge and pad members. It will be observed that the construction described avoids projections on the upper face of the pad adjacent to the sole of the foot. Moreover, the presence of the folds on the pad members or the wedge, as the case may be, in which are formed the guide-grooves for the wedge, stiffens the pad as a whole. It is to be noted that the outer margins of the pad members extend outwardly beyond or overlap the inner margins of the shoe, so that there is no possibility of a nail or other sharp article passing between the pad and the shoe and entering the hoof.

The front and side margins of the pad are provided with extensions $b^2$ $b^3$ $b^3$, respectively, to afford guides by which the said margins are readily guided into the space between the hoof and shoe-bars. Preferably the front end edges of the wedge, at the sides thereof, are cut and folded backwardly over the front ends of the folds $b'$ of the side members of the pad to constitute stop-lugs $b^4$ to prevent the wedge from being unseated or forced backwardly out of place. Preferably the lowermost pad member is provided at its front end with an upturned stop-lug $b^5$, which engages the rear margin of the front part of the shoe and constitutes a stop to limit the insertion of the pad between the shoe and hoof when the wedge is being forced or driven home. In Figs. 4 and 5 we have shown our improved pad in combination with a cushioning-body D, which is attached to the under face of the spreading and locking wedge and which serves to cushion the impact of the hoof against the roadway and absorb the jar of such impact. This form of pad is usually employed in connection with a plain or calkless shoe E. Said pad is made thickest at its rear end and tapers gradually toward the front of the pad and terminates at or adjacent to the center of the pad. The cushion extends outwardly at its rear end beyond the rear ends of the shoe-bars and fits closely between the same, whereby said rear ends of the shoe-bars serve to support or sustain the corners of the pad and prevent the same from being broken away. The pad may be attached to the wedge in any suitable manner, and as a further and separate improvement it is herein shown as attached thereto by means of a plurality of special screws $d$, which are made of spiral or corkscrew shape and provided with heads $d'$, by which they are turned into place. Said screws extend downwardly through the wedge and into the cushioning-body. This form of screw is a desirable form of attaching means, for the reason that it yields, due to its spiral shape, when the pad is compressed by the weight of the horse thereon and springs back to its original position when the cushioning-body again resumes its expanded form.

The pad is economical to make and may be readily applied to and detached from the shoe without the necessity of removing the shoe and constitutes a reliable safeguard from penetration by nails and other sharp articles.

Changes in the structural details of the pad may be made without departing from the spirit of our invention, and we do not wish to be limited to such details except as hereinafter made the subject of specific claims.

We claim as our invention—

1. A hoof-pad comprising two lateral sheet-material members which are hinged at their front ends to swing toward and from each other in their planes and constructed to be fitted at their front and side margins between the shoe and the hoof, the adjacent side margins of the members being folded to constitute grooves, and a sheet-metal spreading and locking wedge, engaging at its margins said grooves, adapted to be forced between said pad members to spread the latter outwardly.

2. A hoof-pad comprising two lateral sheet-material members which are hinged at their front ends to swing toward and from each other in their planes, and constructed to be fitted at their front and side margins between the shoe and the hoof, and a spreading and locking wedge adapted to be forced between said pad members to spread the latter outwardly, said pad being provided at its side and front margins with laterally and forwardly projecting guide extensions.

3. A hoof-pad comprising two lateral sheet-material members which are constructed to be fitted at their front and side margins between the shoe and hoof, a wedge adapted to be inserted between said members to spread the same outwardly to force their side margins between the shoe and hoof, a cushioning-body applied to the under face of said wedge, and attaching-screws extending through said wedge and into the cushioning-body and made of spiral or corkscrew form.

4. A hoof-pad comprising two lateral members which are constructed to be fitted at their front and side margins between the shoe and hoof, a wedge adapted to enter between the said pad members to spread the same outwardly and force their side margins between the hoof and shoe, a cushioning-pad applied to the under face of said wedge, said cushioning-pad extending rearwardly beyond the rear ends of the shoe-bars and filling the space between the bars, whereby the rear ends of the bars support the rear corners of said pad.

5. The combination with a hoof-pad and a cushion, of means for attaching the cushion to the pad comprising a plurality of screws of spiral or corkscrew form which extend through the pad into said cushion.

In testimony that we claim the foregoing as our invention we affix our signatures, in presence of two witnesses, this 7th day of April, A. D. 1903.

WILLIAM B. FAIRWEATHER.
GEORGE DUFFIELD.

Witnesses:
WILLIAM L. HALL,
GERTRUDE BRYCE.